US007004198B1

(12) United States Patent
Okandan et al.

(10) Patent No.: US 7,004,198 B1
(45) Date of Patent: Feb. 28, 2006

(54) MICRO-FLUIDIC INTERCONNECT

(75) Inventors: Murat Okandan, Albuquerque, NM (US); Paul C. Galambos, Albuquerque, NM (US); Gilbert L. Benavides, Los Ranchos, NM (US); Dale L. Hetherington, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 79 days.

(21) Appl. No.: 10/894,636

(22) Filed: Jul. 20, 2004

(51) Int. Cl.
*F16K 37/00* (2006.01)

(52) U.S. Cl. .................. 137/827; 137/554; 137/833; 204/601; 251/368

(58) Field of Classification Search ................ 137/833, 137/554, 827; 251/368; 204/601, 606
See application file for complete search history.

(56) References Cited

U.S. PATENT DOCUMENTS

| 5,501,893 | A |   | 3/1996  | Laermer et al.      |         |
|-----------|---|---|---------|---------------------|---------|
| 5,582,701 | A | * | 12/1996 | Geis et al.         | 204/451 |
| 5,681,484 | A | * | 10/1997 | Zanzucchi et al.    | 216/2   |
| 5,824,204 | A | * | 10/1998 | Jerman              | 204/601 |
| 5,876,675 | A | * | 3/1999  | Kennedy             | 422/99  |
| 6,136,212 | A |   | 10/2000 | Mastrangelo et al.  |         |
| 6,167,910 | B1|   | 1/2001  | Chow                |         |
| 6,273,478 | B1|   | 8/2001  | Benett et al.       |         |
| 6,321,791 | B1|   | 11/2001 | Chow                |         |
| 6,443,179 | B1|   | 9/2002  | Benavides et al.    |         |
| 6,488,315 | B1|   | 12/2002 | Brenner et al.      |         |
| 6,537,437 | B1|   | 3/2003  | Galambos et al.     |         |
| 6,586,885 | B1|   | 7/2003  | Coll et al.         |         |
| 6,645,432 | B1|   | 11/2003 | Anderson et al.     |         |
| 6,648,015 | B1| * | 11/2003 | Chow                | 137/557 |
| 6,755,211 | B1| * | 6/2004  | O'Connor et al.     | 137/554 |

2003/0206832 A1    11/2003   Thiebaud et al.

OTHER PUBLICATIONS

C. Gonzalez et al., "Micro-Joinery: Concept, Definition and Application to Microsystem Development", Sensors and Actuators A, vol. 66, Apr. 1, 1998 pp. 315-332.
D. Duffy et al., "Rapid Prototyping of Microfluidic Systems in Poly(dimethylsiolxane)", Analytical Chemistry, vol. 70, No. 23, Dec. 1, 1998, pp. 4974-4984.
M. Schuenemann et al., "A Highly Flexible Design and Production Framework for Modularized Microelectromechanical Systems", Sensors and Actuators A, vol. 73, Mar. 9, 1999, pp. 153-168.
C. G. J. Schabmueller et al., "Design and Fabrication of a Microfluidic Circuitboard", J. Micromech. Microeng. vol. 9, No. 2, Jun. 17, 1999.
Byung-Ho Jo et al., "Fabrication of Three-Dimensional Microfluidic Systems by Stacking Molded Polydimethysiloxane (PDMS) Layers", Proceedings of SPIE, vol. 3877 (1999), pp. 222-229.
T. Merkel et al., "A New Technology for Fluidic Microsystems Based on PCB Technology," Sensors and Actuators vol. 77, Oct. 12, 1999, pp. 98-105.

(Continued)

*Primary Examiner*—A. Michael Chambers
(74) *Attorney, Agent, or Firm*—William R. Conley

(57) ABSTRACT

An apparatus for simultaneously aligning and interconnecting microfluidic ports is presented. Such interconnections are required to utilize microfluidic devices fabricated in Micro-Electromechanical-Systems (MEMS) technologies, that have multiple fluidic access ports (e.g. 100 micron diameter) within a small footprint, (e.g. 3 mm×6 mm). Fanout of the small ports of a microfluidic device to a larger diameter (e.g. 500 microns) facilitates packaging and interconnection of the microfluidic device to printed wiring boards, electronics packages, fluidic manifolds etc.

76 Claims, 8 Drawing Sheets

OTHER PUBLICATIONS

P. Galambos et al., "Surface Micromachine Microfluidics: Design, Fabrication, Packaging, and Characterization", ASME Winter Annual Meeting, Nashville, TN, Nov. 1999.

P. Galambos et al., "Electrical and Fluidic Packaging of Surface Micromachined Electro-Microfluidic Devices", Proceedings of SPIE, vol. 4177 (2000), pp. 200-207.

J. Voldman, et al., "An Integrated Liquid Mixer-Valve", Journal of Microelectromechanical Systems, vol. 9, No. 3, Sep. 2000, pp. 295-302.

A Gooray et al., "A MEMS Ejector for Printing Applications", Transducers 2001 Conference, Munich Germany, Jun. 2001.

M. Okandan et al., "Development of Surface Micromachining Technologies for Microfluidics and BioMEMS", Proceedings of SPIE, vol. 4560, 2001, pp. 133-139.

P. Galambos et al., "Precision Alignment Packaging for Microsystems With Multiple Fluid Connections", Proceedings of 2001 ASME: International Mechanical Engineering Conference and Exposition, New York, NY, Nov. 11-16, 2001.

P. Galambos et al., "Packaging Dissimilar Materials for Microfluidic Applications", Proceedings of IMECE '02: 2002 ASME International mechanical Engineering Congress and Exposition, New Orleans, Louisiana, Nov. 17-22, 2002.

R. Shul et al., "Deep Reactive Ion Etch (DRIE) Control for High-Aspect Ratio Silicon Structures", American Physical Society Sypmosium, Albuquerque, NM, Oct. 30, 2003.

"Wafer Bonding", [online][retrieved on May 21, 2004] retrieved from the Internet: URL:http//www.memsguide.com/MEMSequipments-Micromachining—bonding_def.htm.

"Glass Transfer Tapes", [online][retrieved on May 21, 2004] retrieved from the Internet:URL:http//www.vitta.com/gtapes.html.

* cited by examiner

US 7,004,198 B1

MICRO-FLUIDIC INTERCONNECT

STATEMENT REGARDING FEDERALLY SPONSORED RESEARCH OR DEVELOPMENT

The United States Government has rights in this invention pursuant to Department of Energy Contract No. DE-AC04-94AL85000 with Sandia Corporation.

BACKGROUND OF THE INVENTION

This invention relates generally to the packaging of, and electrical, optical and fluidic interconnections to microfluidic, electro-microfluidic, and optical-electro-microfluidic devices.

Microfluidic devices may simultaneously require fluidic, optical and/or electrical interconnection. Within the context of this invention, the terms "microfluidic device", "electro-microfluidic device", "optical-microfluidic device", "optical-electro-microfluidic device" and simply "device", all refer to devices requiring microfluidic interconnects, and are used interchangeably.

Microfluidic devices, are generally fabricated in silicon, and control or utilize the flow of a fluid (e.g. liquid or gas). Microfluidic devices typically have very small fluidic access ports, e.g. on the order of 100 microns in diameter; have a small overall footprint e.g. 3 mm×6 mm; and are commonly made in silicon using processes developed by the Micro-Electromechanical-Systems (MEMS) and semiconductor integrated circuit (IC) industry. These devices may utilize MEMS elements, e.g. chemical sensors, biosensors, microvalves, micro-pumps, micro-heaters, micro-pressure transducers, micro-flow sensors, micro-electrophoresis columns for DNA analysis, micro-heat exchangers, micro-chem-lab-on-a-chip, etc. Microfluidic devices have uses in biomedical, chemical analysis, power generation, drop ejection applications and in the production of ink jet printer heads. The latter of which combines electric and fluidic functions on a low-cost, integrated platform. Typically the use of microfluidics in these applications requires the integration of other technologies with the microfluidic devices. For example: optical means may be used to sense genetic content, electronics may be used for chemical sensing, electro-magnetics may be required for electrical power generation, or electrical power may be required for thermal drop ejection.

MEMS microfluidic devices may be fabricated by either bulk micromachining methods, or by surface micromachining technologies. Surface micromachining produces fluidic channel dimensions that are smaller than for bulk micromachining. For example, a typical bulk micromachined channel may have a channel depth of 50 to 100 microns (0.002 to 0.004 inches), whereas a typical surface micromachined channel depth may be on the order of 1 to 5 microns (0.00008 to 0.0002 inches). Making a reliable fluidic connection between two channels having microscale dimensions (e.g. 100 microns or less) is a critical problem. The application of a microfluidic device may require fluidic connection and transitioning from the microscale, e.g. dimensions on the order of 100 microns or less, to the mesoscale, e.g. dimensions on the order of 500 microns, to the macroscale, e.g. dimensions on the order of 1 mm (1/16 inch). Where at the macroscale, fluidic interconnections may be made by conventional tubing or SWAGELOK™ (Swagelok, Inc., Solon, Ohio) connectors.

Another difficulty encountered in packaging microfluidic devices is that multiple fluidic interconnections often need to be made in a very small area. For example: Tens of very small (e.g. 10 to 200 micron diameter inlet and outlet ports) fluidic connections may be required within the area of a typical microfluidic device (e.g. on the order of 3 mm×6 mm). These fluidic connections may be closely spaced (e.g. 300 to 500 microns between fluidic connecting ports) and may require precise alignment (on the order of 1 to 10 microns). Attempts to manually assemble multiple microfluidic connections, within the required alignment tolerances, can prove difficult, labor-intensive and costly. See for example: Galambos, et. al, "Packaging Dissimilar Materials for Microfluidic Applications", Proceedings of IMECE'02, 2002 ASME International Mechanical Engineering Congress and Exposition, New Orleans, La., Nov. 17–22, 2002.

What is needed is a system for interconnection to microfluidic devices that can provide; multiple interconnections in a small area, alignment precision on the order of 1 to 10 microns, be leak tight, easy to assemble, chemically resistant, possess a low dead volume, have smooth fluidic transitions, and be low cost to assemble, and be amenable to automated assembly. Additionally what is needed is a packaging approach that can provide microfluidic, electrical and optical interconnections, for integrating fluidic, electrical, optical, and hybrid devices that can contain a combination of functionality.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

Figure 1A:
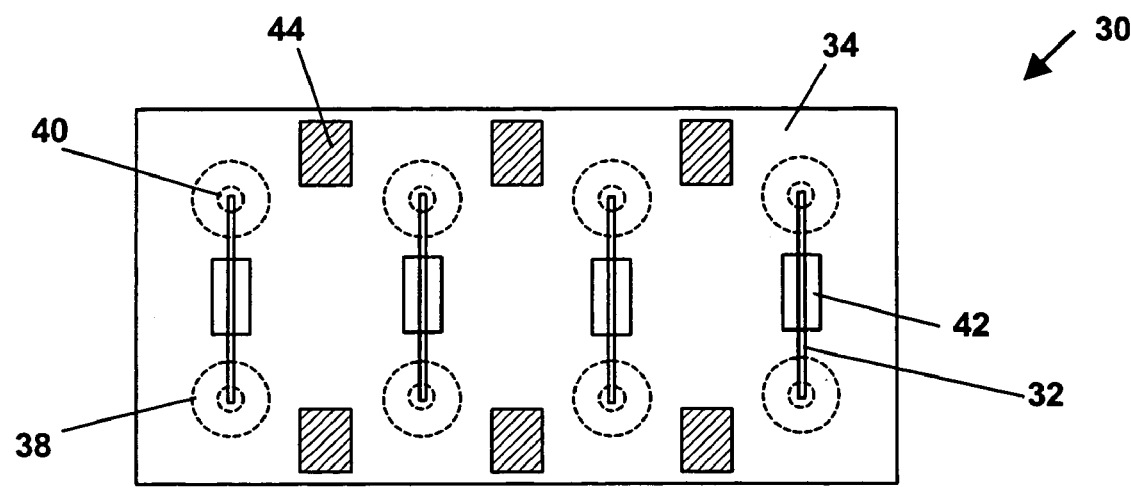
FIG. 1A illustrates the upper surface of an electro-microfluidic device.
Figure 1B:
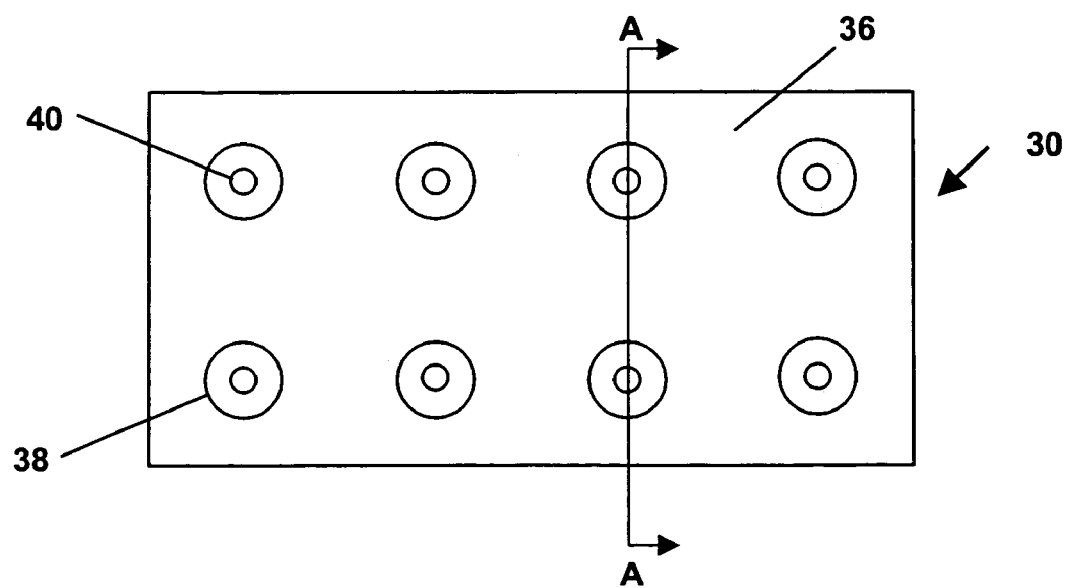
FIG. 1B illustrates the lower surface of an electro-microfluidic device.
Figure 1C:
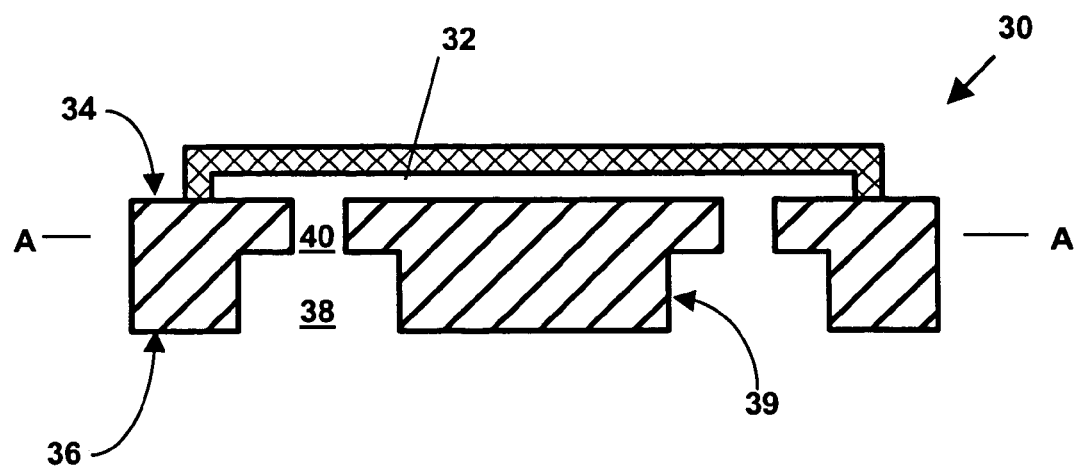
FIG. 1C is a cross-section of an electro-microfluidic device.

FIGS. 1A through 1C illustrate a typical microfluidic device 30 having a top surface 34 and opposed lower surface 36. FIG. 1A is a view of the top surface of microfluidic device 30, FIG. 1B is a view of the opposed lower surface of the device and FIG. 1C is a cross sectional view of the device. The microfluidic device 30 may be formed using bulk micromachining methods, or by surface micro-machining methods as described in U.S. Pat. No. 6,537,437 to Galambos et. al., herein incorporated by reference, and referred to in the following as the '437 patent. As used in the context of this specification, the term "microfluidic device" or simply a "device" refers to any device requiring microfluidic connections and includes devices additionally requiring electrical and/or optical interconnections, e.g. "electro-microfluidic" and "opto-electro-microfluidic" devices. Microfluidic devices typically have very small fluidic access ports, e.g. 100 micron diameter; have a small overall footprint e.g. 3 mm×6 mm; and are commonly made in silicon using processes developed by the MEMS and semiconductor IC industries.

Referring to FIG. 1A, microfluidic device 30 may con contain multiple functional elements 42 including: chemical sensors, biosensors, valves, pumps, heaters, pressure transducers, flow sensors, electrophoresis columns for DNA analysis, heat exchangers, chem-lab on a chip, etc. Microfluidic functional elements 42 may be disposed along a fluidic pathway 32, fabricated in microfluidic device 30. Microfluidic pathways 32 can be terminated at a fluidic access port. A fluidic access port may comprise a fluidic opening 40, in fluid communication with fluidic pathway 32, wherein fluidic opening 40 is disposed on the bounding surface of cavity 38. Functional elements 42 may require fluidic, electrical and optical interconnection to other functional elements within the same device 30, to other microfluidic devices, or interconnection to electro-microfluidic packaging, fluidic printed wiring boards, power supplies, fluid sources, fluid delivery tubing and piping, support electronics, data collection and processing systems, etc. Electrical connections as required, can be accomplished through conductive bond pads 44, disposed on a surface of device 30, where the conductive bond pads are electrically connected to circuitry as may be fabricated in device 30.

Referring to FIG. 1B, there can be a multiple of cavities 38 within the footprint (e.g. on the order of 3 mm×6 mm) of device 30.

Referring to FIG. 1C, fluidic pathway 32 may be formed on the top surface 34 of device 30, and be fluidically connected to fluidic opening 0.40 disposed on the bounding surface 39 of cavity 38. Fluidic pathway 32 may be on the order of 1 to 5 microns in cross-sectional dimension, fluidic opening 40 may be on the order of 20 to 100 microns in diameter, and cavity 38 may be on the order of 100 to 500 microns in diameter. For illustrative purposes cavities 38 are shown as cylindrical features extending into the bulk of device 30 from the lower surface 36. For the purposes of the present invention, the cavity can comprise any geometric or irregular shape, defined by a bounding surface 39, whereupon fluidic opening 40 is disposed.

Figure 2A:
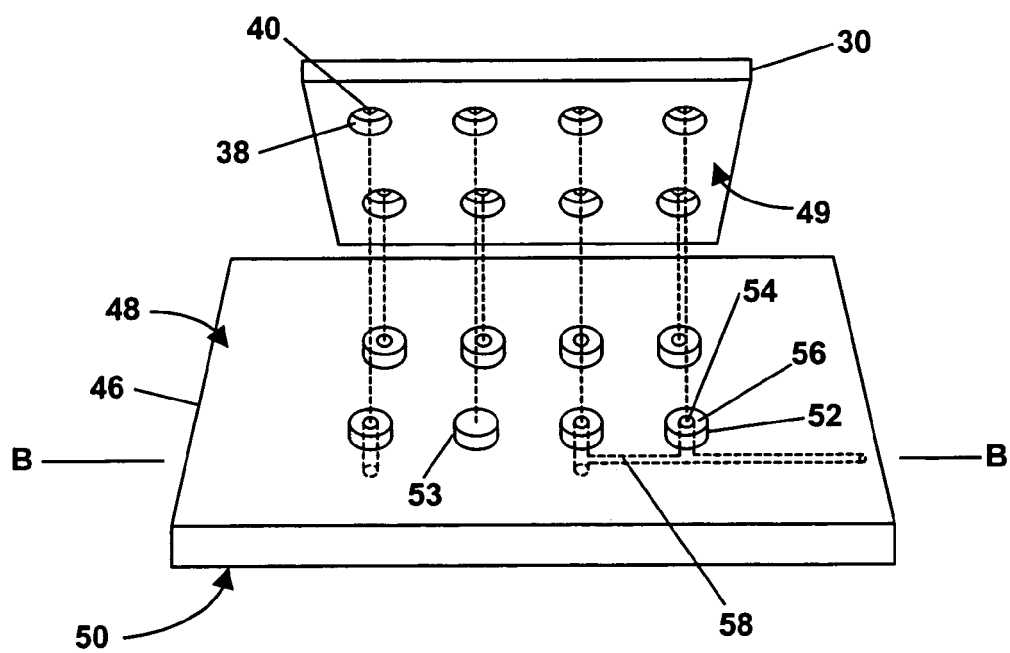
FIG. 2A is a perspective view of an embodiment of the invention.

FIG. 2A shows an embodiment of the present invention, wherein a substrate 46 has an upper surface 48 and an opposed lower surface 50. Substrate 46 is generally planar and may be fabricated from silicon, glass, ceramic, polymeric or metallic materials. Disposed on upper surface 48 are one or more raised extensions 52. A fluidic opening 54 may be disposed on the bounding surface 56 of extension 52. Fluidic opening 54 can be connected to fluidic pathway 58 within substrate 46. A plurality of fluidic pathways 58 may extend through the thickness of substrate 46, or may traverse laterally through the bulk of the substrate, interconnecting with other fluidic pathways, and may interconnect one or more fluidic openings 54. Fluidic opening 54 may be on the order of 20 to 100 microns in diameter. Extension 52, may be on the order of 100 to 500 microns in diameter. The bounding surface 56 of an extension may be spaced from upper surface 48 by a distance on the order of 100 to 500 microns. For illustrative purposes extensions 52 are shown as cylindrical features extending outward from upper surface 48. For the purposes of the present invention, the extensions can comprise any geometric or irregular shape, defined by a bounding surface 56, whereon fluidic opening 54 is disposed. One or more extensions 52, may extend from upper surface 48 of substrate 46, and may be spaced and dimensioned so as to interfit with corresponding cavities 38 on microfluidic device 30.

Figure 2B:
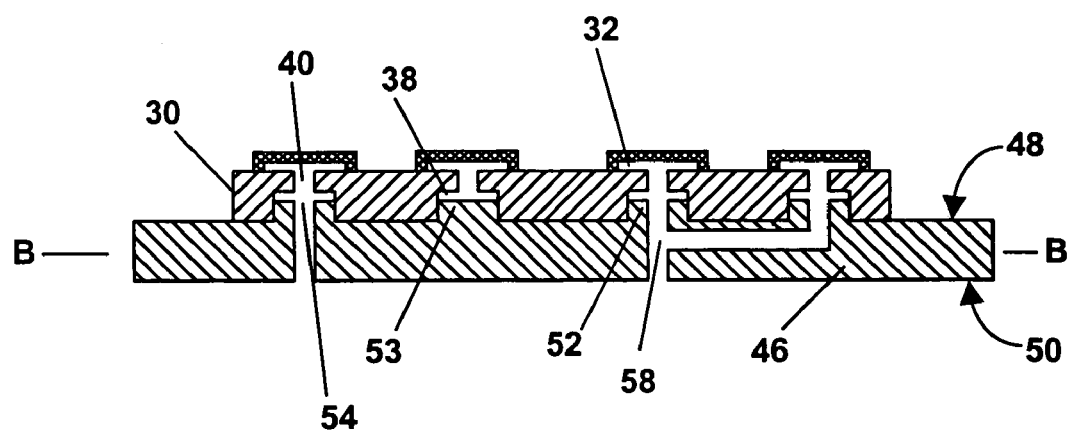
FIG. 2B is a cross-section of the embodiment in FIG. 2A.

As shown in FIG. 2B, placing microfluidic device 30 onto substrate 46 so that extensions 52 interfit with cavities 38, connects fluidic opening 54 with fluidic opening 40, thereby providing fluidic interconnection of microfluidic channel 32 in device 30, with fluidic pathway 58 within substrate 46. For embodiments where device 30 and substrate 46 comprise silicon, cavities 38 and extensions 52 may be formed by a deep reactive ion etching (RIE) process. Such a process is disclosed in U.S. Pat. No. 5,501,893 to Laermer et. al. which is herein incorporated by reference.

Using precision machining processes (e.g. micro-machining, RIE, electrical discharge machining (EDM), embossing, micro-molding, micro-milling, micro-drilling etc.) to fabricate access ports 38 in device 30, and interfitting extensions 52 (and 53) on substrate 46, precise alignment (e.g. on the order of 1 to 10 microns) of fluidic opening 40 in device 30 with fluidic opening 54 in substrate 46 can be maintained. By these means, a plurality of fluidic interconnections may easily and simultaneously be made, fluidically coupling a plurality of micro-channels 32 in device 30 with multiple fluidic pathways 58 in substrate 46.

Extensions 53 may exist that do not contain a fluidic opening and as such may be used for alignment of device 30 to substrate 46. Fluidic opening 54 and extension 52 are illustrated as circular in cross-section to interfit with cavity 38. Other cross-sections are anticipated and may include; square, rectangular, polygonal, elliptical etc. For simplicity, only one microfluidic device 30 is shown to be interconnected with substrate 46, while interconnection of multiple devices 30 or additional substrates, to substrate 46 are anticipated by the present invention.

Referring again to FIG. 2B, the lower surface of microfluidic device 30 may be joined to the upper surface 48 of substrate 46 by a bonding means to effect mechanical attachment of the device to the substrate, and may additionally provide for sealing the fluidic interconnections. Where device 30 and substrate 46 comprise silicon, oxidized silicon, or glass, suitable bonding means can include anodic bonding and direct bonding methods. In such bonding processes, interdiffusion occurs between the two surfaces being joined, typically under the stimuli of one or more of heat, electrical potential and pressure. A distinct bonding layer may not be visible to the unaided eye but, rather the bonding layer may consist of an atomically diffused layer.

Figure 3:
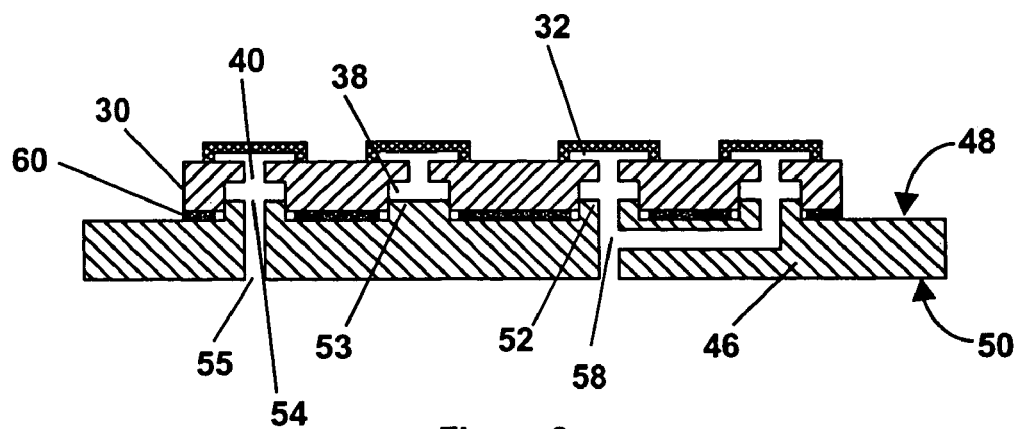
FIG. 3 is a cross-section of another embodiment of the invention.

In FIG. 3, another embodiment of the present invention comprises an adhesive layer 60, disposed between the lower surface of device 30 and the upper surface 48 of substrate 46. As used in this specification, the term "adhesive layer" refers to liquid adhesive, sheet adhesive, double sided adhesive, conductive adhesive, non-conductive adhesive, thermoplastic polymer, thermoset polymer, transfer tape, epoxy, cyanate ester, cyanoacrylates, polyester, polyamide and polyimide. For the purposes of this specification, the term "adhesive layer" also refers to materials used in processes including soldering, brazing and fusible glass sealing. The length of extension 52 and depth of cavity 38 can be adjusted to accommodate the thickness of a bonding layer or an adhesive layer 60, and there only needs to be minimal interfitting of the extension into the cavity (e.g. on the order of 10 microns or greater) to provide an interconnection.

Figure 4A:
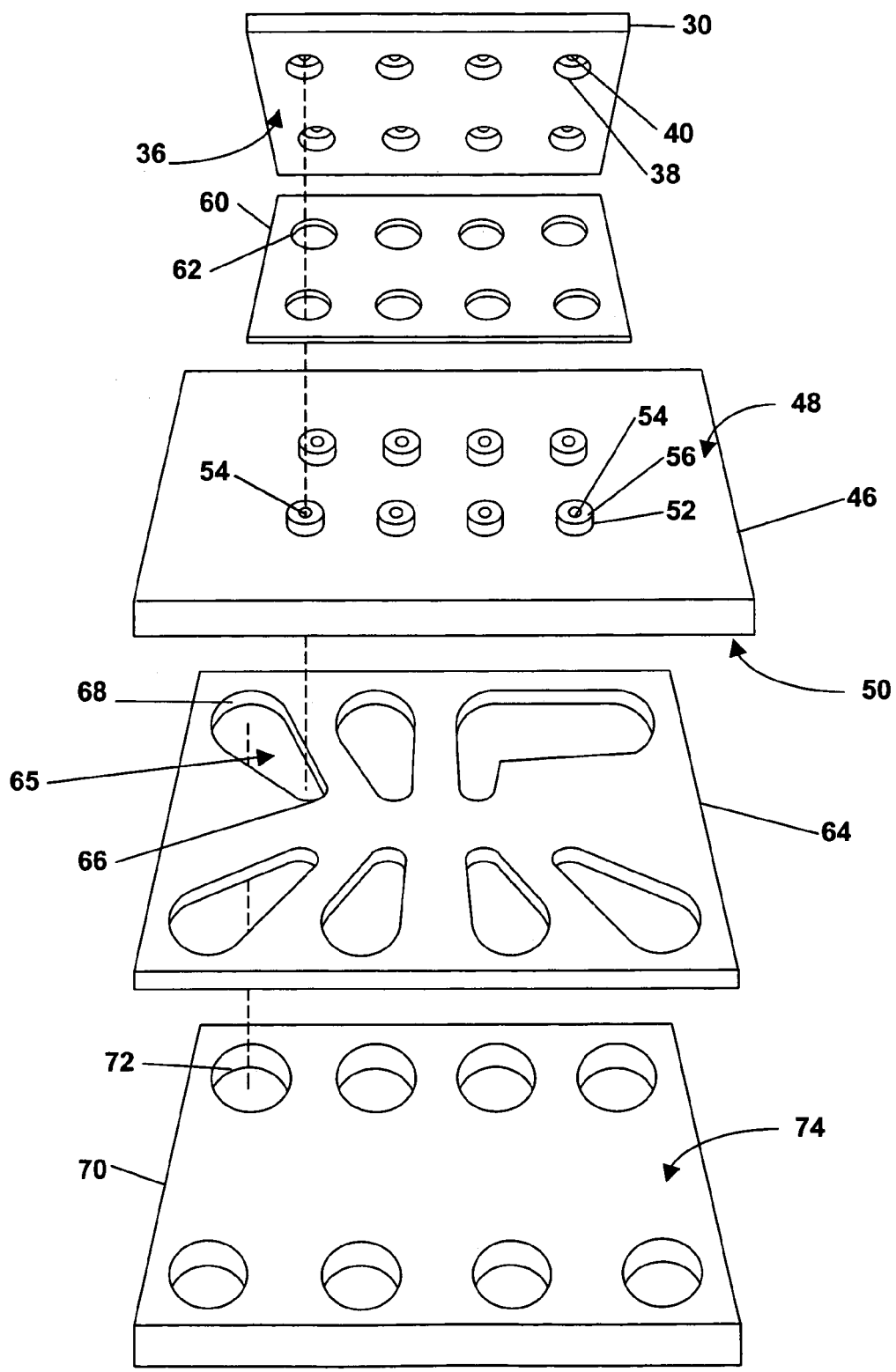
FIG. 4A is a perspective view of another embodiment of the invention.

FIG. 4A is a perspective view of another embodiment according to the present invention. A plurality of extensions 52 are disposed on the upper surface 48 of substrate 46 and are dimensioned and spaced to interfit into cavities 38 on the lower surface 36 of microfluidic device 30. A first adhesive layer 60 is disposed between the lower surface 36 of device 30 and the upper surface 48 of substrate 46. Adhesive layer 60 may comprise through holes 62 that are substantially aligned with and dimensioned to allow extensions 52, clearance to pass through the adhesive layer, and interfit with cavities 38. Through holes 62 may have a diameter greater than the diameter of the extensions 52 and may be on the order of 100 to 500 microns. Adhesive layer 60 may provide mechanical bonding of microfluidic device 30 to substrate 46, and may additionally provide sealing of the fluidic connection between extension 52 and cavity 38.

A second adhesive layer 64 is disposed between the lower surface 50 of substrate 46 and the upper surface 74 of a second substrate 70. Second substrate 70 may comprise a plurality of fluidic openings 72. Fluidic openings 72 may be on the order of 500 microns in diameter or greater. Adhesive layer 64 may comprise a plurality of channels 65, disposed through the thickness of the adhesive layer. Channels 65 interconnect fluidic opening 54 (through fluidic pathway 58) with fluidic opening 72. Channels 65 may have a small diameter end 66 (e.g. 100–500 microns in diameter) and a larger diameter end 68 (e.g. on the order of 500 microns or greater). Large diameter end 68 may be spaced radially outward from small diameter end 66 so as to provide a fanout of the fluidic interconnection. The center of small diameter end 66 is substantially aligned with the center of fluidic opening 54, and the center of large diameter end 68 is substantially aligned with the center of fluidic opening 72. A fanout as may be incorporated in channel 65 and provides for a greater spacing between the centers of adjacent larger diameter fluidic openings (e.g. 72) than the spacing between the centers of adjacent smaller diameter holes (e.g. 54). Channels 65 may also interconnect one or more fluidic openings 54 to one or more fluidic openings 72.

Figure 4B:
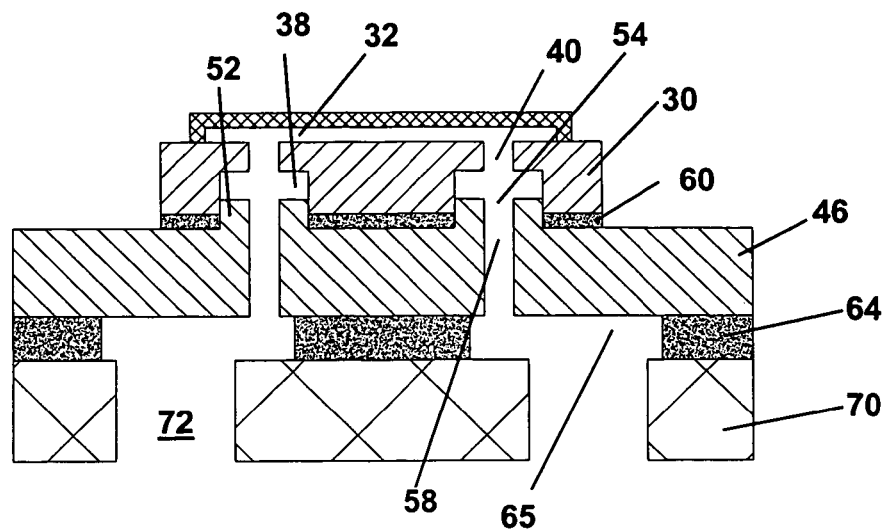
FIG. 4B is a cross-section of the embodiment in FIG. 4A.

Referring to FIG. 4B, assembly of the microfluidic device 30, substrate 46 and second substrate 70 by means of adhesive layers 60 and 64, completes one or more fluidic interconnections, where large diameter fluidic opening 72 (e.g. on the order of 500 microns or greater) is fluidically connected to microfluidic channel 32 (e.g. on the order of 1 to 5 microns) by means of fanout channel 65, fluidic pathway 58 and fluidic opening 40. Alignment (e.g. on the order of 1 to 10 microns) of the smaller diameter (e.g. on the order of 20 to 100 micron) fluidic opening 40, in device 30, to fluidic opening 54 (e.g. on the order of 20 to 100 micron) in substrate 46 is provided for by the interfitting of extension 52 with cavity 38. The outer diameter of extension 52 may be nearly equal to the diameter of cavity 38 to provide a tight "interference fit", or the diameter of extension 52 may be slightly less (e.g. on the order of 1 to 20 microns less) than the diameter of fluidic opening 38 to facilitate assembly as an application warrants.

Substrate 70 may comprise an electrically insulating material (e.g. a ceramic, a polymer, a plastic, a glass, a glass-ceramic composite, a glass-polymer composite, a resin material, a fiber-reinforced composite, a glass-coated metal, or a printed wiring board composition, FR-4, epoxy-glass composite, epoxy-polyimide composite, polyamide, fluoropolymer, polyether ether ketone or polydimethylsiloxane). The ceramic material can comprise alumina, beryllium oxide, silicon nitride, aluminum nitride, titanium nitride, titanium carbide, silicon carbide, diamond and diamond like substrates, glass-ceramic composite, glass-coated metal, low temperature co-fired ceramic multilayered material or high-temperature co-fired ceramic multilayered material. Fabrication of ceramic substrates can be performed by processes such as slip casting, machining in the green state, cold isostatic pressing (CIP), hot isostatic pressing (HIP) or sintering. Fabrication of plastic and polymer substrates may be performed by processes such as transfer molding, injection molding, embossing, lamination and machining. Substrate 70 may comprise a test fixture, test head, printed wiring board, electronics package, flexible interconnect (flexible printed wiring board) or fluidic manifold.

In the present invention, adhesive layers 60 and 64 can be any type of adhesive material. Layers 60 and 64 may be a thin double-sided adhesive film. The terms "adhesive tape" and "adhesive film" have the same meaning within this specification. The film can have a thickness on the order of from 0.05 mm to 0.25 mm. The film may be VHB™ acrylic adhesive transfer tape, e.g. F-9460PC (50 microns thick), F-9469PC (130 microns thick), or F-9473PC (250 microns thick), manufactured by the 3M Corporation, St. Paul, Minn. An adhesive transfer tape generally comprises a film of adhesive disposed in-between one or two sheets of a releasable, non-stick paper protective liner. Alternatively, the adhesive film can be applied to both sides of a polymeric carrier film (e.g. core, or backing) such as "double-sticky" or "double-sided" adhesive tape. The carrier film can included a foam layer to provide increased compliance for bonding rough surfaces. If required, electrically conductive particles (e.g. silver or copper) can be embedded within the adhesive material to increase thermal and electrical conductivity.

Alternatively, adhesive layers 60 and 64 may comprise a liquid of either thermoplastic or thermoset adhesives. Electrically conductive epoxy die-attach adhesives may be used to attach (e.g. adhere) the microfluidic device 30 to substrate 46 while providing electrical interconnection as well. Alternatively, adhesive layers 60 and 64 may comprise a film of adhesive sprayed, evaporated or vapor deposited onto a surface (e.g. first substrate upper surface 48). Typical materials that may comprise adhesive layer 60 include epoxies, cyanate esters, cyanoacrylates, polyesters, polyamides, polyimides and combinations thereof. As yet another alternative, adhesive layers 60 and 64 may comprise materials as used in processes including soldering, brazing and fusible glass sealing.

FIG. 4B illustrates an embodiment where device 30 is adhesively bonded to substrate 46 by adhesive layer 60. As described above, other embodiments are envisioned wherein adhesive layer 60 in FIG. 4B may be replaced with a bonding means such as direct bonding or anodic bonding.

Figure 5:
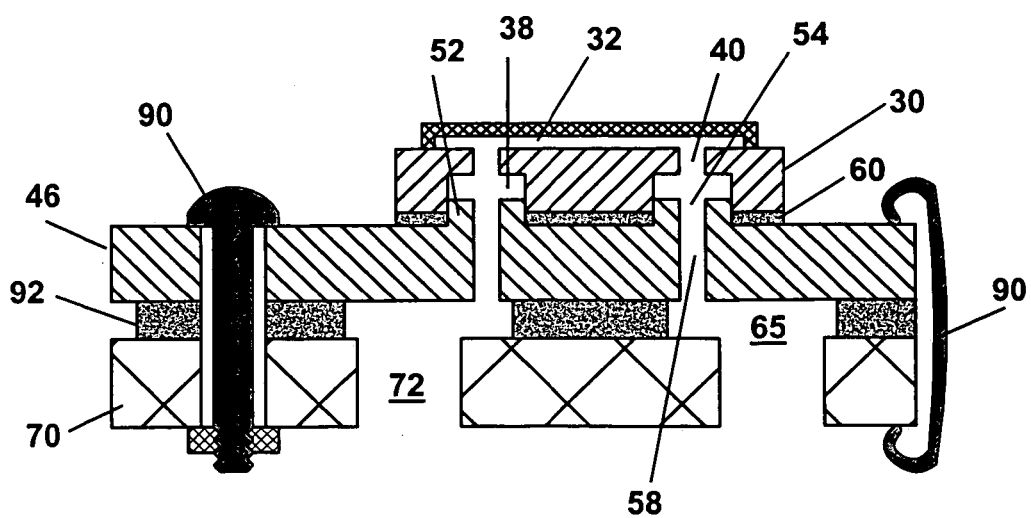
FIG. 5 is a cross-section of another embodiment of the invention.

FIG. 5 illustrates an embodiment of the invention where an adhesive layer 60 is in contact with the lower surface of device 30 and the upper surface of substrate 46. A sealing means 92 contacts the lower surface of substrate 46 and the upper surface of second substrate 70. Sealing means 92 can be a compliant material (e.g. a gasket) for substantially sealing the fluidic interconnect and may comprise paper or other fibrous materials, rubber, neoprene, Buna-n rubber, gum rubber, fluoro-elastomers, viton, silicone, silicone rubber, Teflon, grafoil, hypalon and vinyl. Through holes 65 can exist in sealing means 92, providing fluidic interconnection of fluidic opening 72 in second substrate 70 with fluidic opening 54 in substrate 46 via fluidic pathway 58. Clamping means 90 is provided for applying pressure to sealing means 92, between the upper surface of second substrate 70 and the lower surface of substrate 46. Clamping means 90 can include; spring clamps, threaded fasteners, dead weights, clips, cam locking devices, vacuum clamping, pressurized gas activated clamps or pawls.

FIG. 5 illustrates an embodiment where device 30 is adhesively bonded to substrate 46 by adhesive layer 60. As described above, other embodiments are envisioned wherein adhesive layer 60 in FIG. 4B may be replaced with a bonding means such as direct bonding or anodic bonding.

Figure 6A:
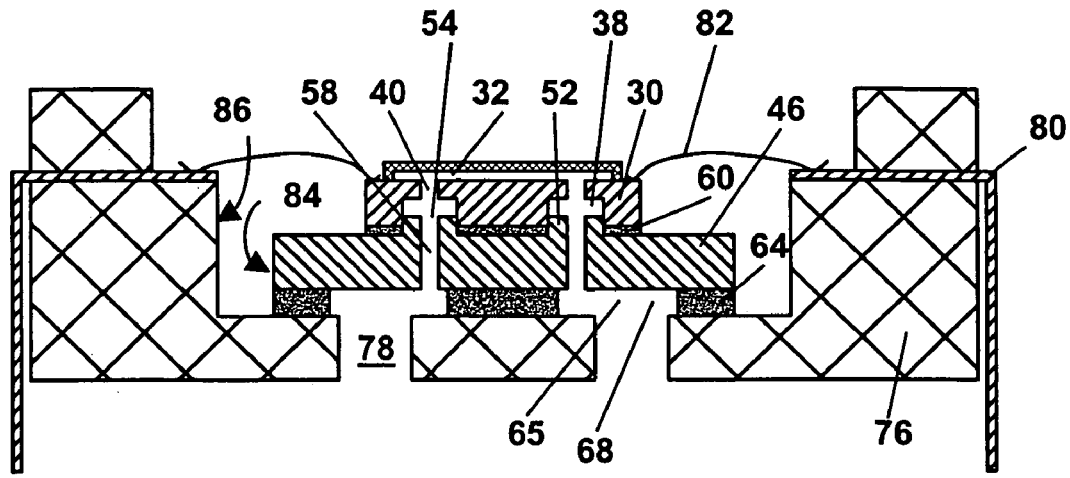
FIG. 6A is a cross-section of another embodiment of the invention.

FIG. 6A illustrates another embodiment of the present invention where microfluidic device 30 is bonded to substrate 46 by adhesive layer 60, and substrate 46 is bonded to base 76 by adhesive layer 64. Base 76 may comprise an electronics package, e.g. as described in U.S. Pat. No. 6,443,179 issued to Benavides et. al. herein incorporated by reference. Base 76 may comprise a polymer, ceramic, glass or metal package, for e.g.: a DIP (dual in-line package), TO style can package, quad flatpack (QFP), pin grid array (PGA), ball grid array (BGA), small outline (SO), chip carrier (CC), or plastic leaded chip carrier (PLCC).

Assembly of the microfluidic device 30, substrate 46 and base 76 by means of adhesive layers 60 and 64, completes one or more fluidic interconnections, where large diameter fluidic opening 78 (e.g. on the order of 500 microns or greater) in base 76, is aligned and fluidically connected to microfluidic channel 32 (e.g. on the order of 1 to 5 microns) by means of fanout channel 65, fluidic pathway 58 and fluidic opening 40. Alignment (e.g. on the order of 1 to 10 microns) of the smaller diameter (e.g. on the order of 20 to 100 micron) fluidic opening 40, to fluidic opening 54 (e.g. on the order of 20 to 100 micron) in substrate 46 is provided for by the interfitting of extension 52 with cavity 38. The diameter of extension 52 may be nearly equal to the diameter of cavity 38 to provide a tight "interference fit", or the diameter of extension 52 may be slightly smaller (e.g. on the order of 1 to 20 microns smaller) than the diameter of cavity 38 to facilitate assembly as an application warrants. Alignment (e.g. on the order of 25 microns or greater) of the larger diameter end 68 of fanout channel 65 to fluidic opening 78 may be accomplished manually or through the use of automated assembly equipment (e.g. a "pick and place" system).

Adhesive layer 64 may be aligned and "pre-assembled" to base 76 prior to placing substrate 46 onto base 76. Base 76 may comprise a recessed cavity having an inner edge 86 into which substrate 46 is placed. Alignment of substrate 46 to base 76, and therefore to fanout channels 65 in adhesive layer 64, may be provided by minimizing the spacing between the cavity inner edge 86 and the outer edge 84 of substrate 46. For example, the spacing may be on the order of 50 microns or greater, depending on an applications requirements.

Figure 6B:
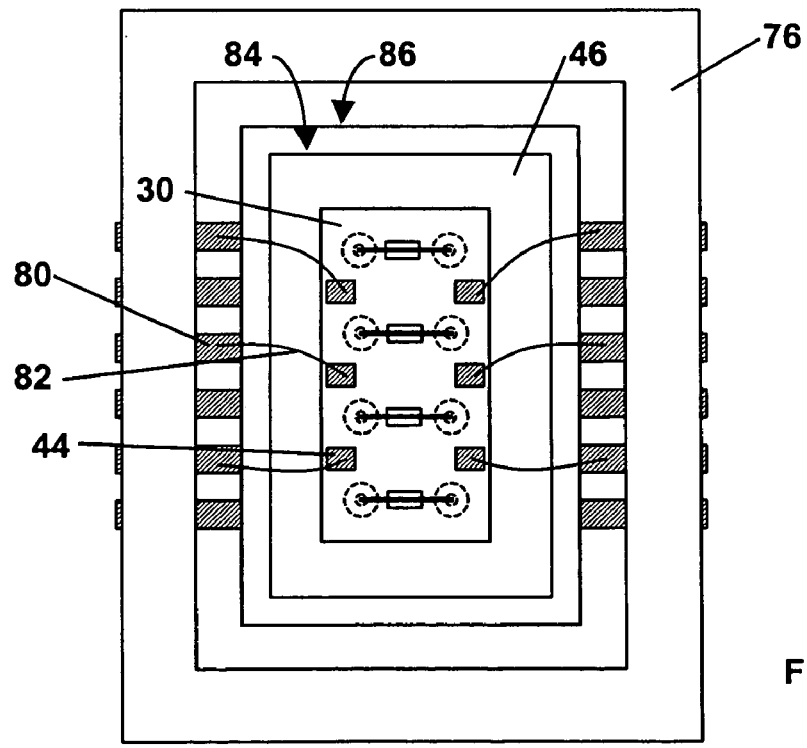
FIG. 6B is a top view of the embodiment in FIG. 6A.

Referring to FIG. 6B, base 76 may comprise conductive leads 80 that may be electrically interconnected to conductive pads 44 on device 30. Electrical interconnection of pads 44 to leads 80 may be by means of wire bonds 82 as illustrated, or alternatively may be made by other methods including solder bumps, tape automated bonding (TAB), conductive adhesives, flip chip or beam lead bonding. Base 76 may be further interconnected to (not shown) a test fixture, test head, printed wiring board, flexible interconnect (flexible printed wiring board) or fluidic manifold.

Figure 7:
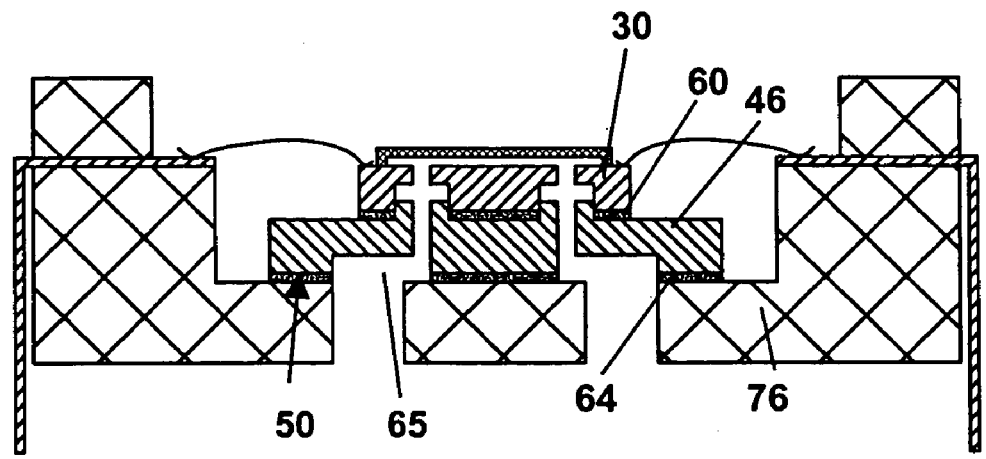
FIG. 7 is a cross-section of another embodiment of the invention.

Referring to FIG. 7, in another embodiment of the invention, fanout channels 65 may be fabricated in the back surface 50 of substrate 46.

Figure 8:
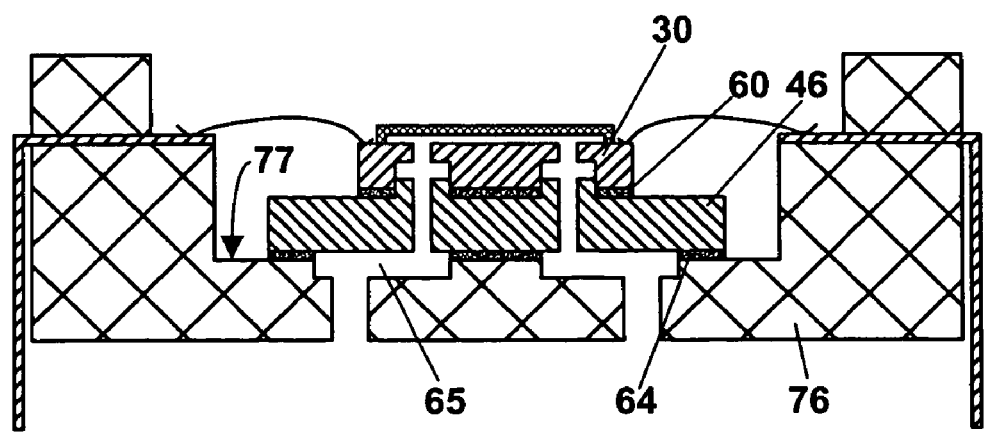
FIG. 8 is a cross-section of another embodiment of the invention.

Referring to FIG. 8, in another embodiment of the invention, fanout channels 65 may alternatively be fabricated in the upper surface 77 of the base 76. Example processes used to fabricate fanout channels 65 according to the embodiments shown in FIGS. 7 and 8 may include: precision machining, chemical or plasma etching, RIE, micromachining, EDM, embossing, molding, micro-molding, micro-milling, micro-drilling etc. For the purposes of the present invention, providing a fanout in the fluidic connection of a substrate 46 to a base 76 (or another substrate) comprises those embodiments where a fanout channel is provided in substrate 46, or base 76, or within the adhesive layer 64.

Figure 9:
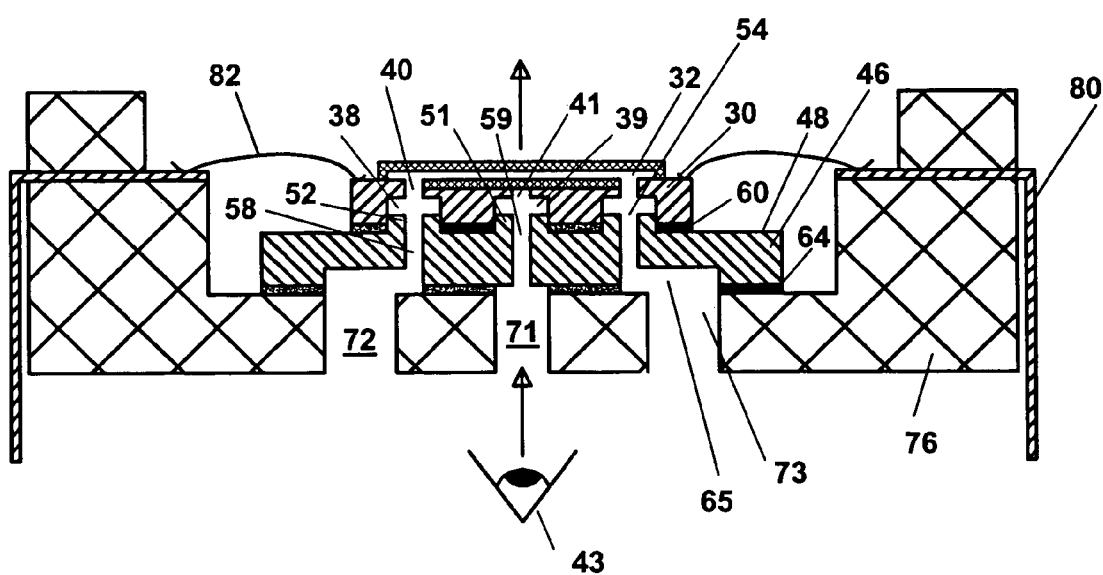
FIG. 9 is a cross-section of another embodiment of the invention.

FIG. 9 illustrates another embodiment of the present invention, where microfluidic device 30 comprising a microfluidic channel 32, fluidically connected to cavity 38 by fluidic opening 40, additionally comprises means for optically accessing the microfluidic channel 32, in device 30. The means for optically accessing device 30 comprises an optical access 41 to the microfluidic channel 32, connected to an optical cavity 39 on the lower surface of device 30, connected to an optical pathway 59 in substrate 46, connected to an optical pathway 71 in base 76. Optical access cavity 39 has substantially the same dimensions as described above for fluidic access cavity 38. Optical access means may provide, for example, an optical path from the exterior of device 30, through optical access port 39 and optical pathway 41, to microfluidic channel 32, for e.g. allowing spectroscopic or chemical analysis (e.g. 43) of a fluid contained within microfluidic channel 32. As described in Patent '437 to Galambos et. al., fluidic channel 32 may comprise optically transparent materials, e.g. such as silicon nitride. Fluidic 40 and optical 41 pathways may be on the order of 20 to 100 microns in diameter. Fluidic 38 and optical access cavities may be on the order of 100 to 500 microns in diameter.

Substrate 46 provides for alignment and interconnection of the optical and fluidic access cavities of device 30, and may additionally provide for electrical interconnection of device 30, to a base, for example, electronics package 76. A base may alternatively comprise a test fixture, test head, printed wiring board, flexible interconnect (flexible printed wiring board) or fluidic manifold. An extension 51 of upper surface 48 of substrate 46 may be dimensioned and spaced to interfit with optical access cavity 39 of device 30 and may provide for alignment and interconnection of optical pathway 41 with an optical pathway 59 within substrate 46. Extension 52 of the upper surface 48 of substrate 46 may be dimensioned and spaced to interfit with fluidic access port 38 to provide for alignment and interconnection of fluidic pathway 40 within device 30, to fluidic pathway 58 within substrate 46. By means of the raised extensions 51 and 52, dimensioned and spaced to interfit with optical and fluidic access cavities 39 and 38 respectively, multiple optical and fluidic interconnects can be made simultaneously between device 30 and substrate 46. An adhesive layer 60 may be disposed between device 30 and substrate 46 to provide mechanical attachment of the device to the substrate and may provide for sealing of the optical and fluidic interconnects. Through holes may be provided in adhesive layer 60 to provide clearance for, and allow raised extensions 51 and 52 to mate into cavities 39 and 38 respectively.

An adhesive layer 64 comprising through holes 65, may be disposed between substrate 46 and base 76 to provide mechanical attachment of substrate 46 to base 76, and may provide for sealing of optical 59 and fluidic 58 pathways in substrate 46 to optical 71 and fluidic 73 pathways in base 76.

Assembly of the microfluidic device 30, substrate 46 and base 76 by means of adhesive layers 60 and 64, can provide multiple optical and fluidic interconnections, where large diameter fluidic opening 72 (e.g. on the order of 500 microns or greater) is fluidically connected to microfluidic channel 32 (e.g. on the order of 1 to 5 microns) by means of fluidic pathway 73 in base 76, fluidic pathway 58 in substrate 46, and fluidic pathway 40, in device 30. Similarly, means for optically accessing fluidic channel 32 is provided by optical pathway 71 disposed through substrate 76, connected to optical pathway 59 through substrate 46, and further aligned and connected to optical pathway 41 in device 30. Alignment (e.g. on the order of 1 to 10 microns) of the smaller diameter (e.g. on the order of 20 to 100 micron) fluidic and optical pathways 40, and 41 respectively, in device 30, to fluidic and optical pathways 58 and 59 respectively (e.g. on the order of 20 to 100 micron) in substrate 46 are provided for by the interfitting of extensions 52 and 51, to the fluidic and optical openings 38 and 39 respectively.

Electrical interconnection of device 30 to base 76 may be by means of wire bonds 82 as illustrated, or alternatively may be made by other methods including solder bumps, tape automated bonding (TAB), conductive adhesives, flip chip or beam lead bonding. Base 76 may be further interconnected to (not shown) a test fixture, test head, printed wiring board, flexible interconnect (flexible printed wiring board) or fluidic manifold.

Means for optically accessing device 30 can include optical pathways as through holes (e.g. 41, 59 and 71) in the device 30, substrate 46 and base 76. Means for optically accessing device 30 can also include filling of the optical pathways with an optically transparent material such as glass, polymers, silicon nitride, polydimethylsiloxane, photo-definable glass (Foturan™), silicon, silicon dioxide. Optical pathways 59 and 71 may extend through the thickness of the substrate 46 and base 76 respectively, or may extend laterally through their bulk as well.

Base 76 may be further mounted on a test fixture, test head, printed wiring board, flexible interconnect (flexible printed wiring board) or fluidic manifold (not shown) as needed for a particular application.

As illustrated in FIG. 9, fanout of small diameter fluidic openings 54 to large diameter fluidic openings 72 may be accomplished by channels 65 fabricated within substrate 46. The present invention anticipates alternatively fabricating fanout channels within base 76 or by means of cutouts through adhesive layer 64.

What is claimed is:

1. A microfluidic interconnect comprising:
    a first substrate comprising:
        a first upper surface and an opposed first lower surface;
        a cavity disposed in the first lower surface, the cavity having a first bounding surface, and a first fluidic opening disposed on the first bounding surface;
        a first fluidic pathway disposed within the first substrate, fluidicaily connected to the first fluidic opening;
    a second substrate comprising:
        a second upper surface and an opposed second lower surface;
        an extension disposed on the second upper surface, the extension having a second bounding surface and a second fluidic opening disposed on the second bounding surface;
        a second fluidic pathway disposed within the second substrate, fluidically connected to the second fluidic opening;
    means for bonding the first lower surface of the first substrate to the second upper surface of the second substrate, the bonding means having a through hole, substantially aligned with the extension on the second upper surface of the second substrate;
    the extension and the cavity being dimensioned and spaced to interfit, fluidically connecting the first fluidic opening to the second fluidic opening, thereby fluidically connecting the first fluidic pathway in the first substrate with the second fluidic pathway in the second substrate.

2. The microfluidic interconnect of claim 1 wherein the first substrate further comprises a silicon substrate.

3. The microfluidic interconnect of claim 2 wherein the second substrate further comprises a silicon substrate;.

4. The microfluidic interconnect of claim 3 wherein the bonding means comprises one or more selected from the group consisting of: an anodic bond, and a direct bond.

5. The microfluidic interconnect of claim 4 wherein the first substrate further comprises a microfluidic device, in fluid communication with the first fluidic pathway.

6. The microfluidic interconnect of claim 5 wherein the diameter of the first fluidic opening is between about 20 microns and 100 microns.

7. The microfluidic interconnect of claim 6 wherein the diameter of the cavity is between about 100 microns and 500 microns.

8. The microfluidic interconnect of claim 7 wherein the diameter of the extension is between about 100 microns and 500 microns.

9. The microfluidic interconnect of claim 8 wherein the diameter of the second fluidic opening is between about 20 microns and 100 microns.

10. A microfluidic interconnect comprising:
    a first substrate comprising:
        a first upper surface and an opposed first lower surface;
        a cavity disposed in the first lower surface, the cavity having a first bounding surface, and a first fluidic opening disposed on the first bounding surface;
        a first fluidic pathway disposed within the first substrate, fluidically connected to the first fluidic opening;
    a second substrate comprising:
        a second upper surface and an opposed second lower surface;
        an extension disposed on the second upper surface, the extension having a second bounding surface and a second fluidic opening disposed on the second bounding surface;
        a second fluidic pathway disposed within the second substrate, fluidically connected to the second fluidic opening;
    an adhesive layer in contact with the first lower surface of the first substrate and the second upper surface of the second substrate, the adhesive layer having a through hole, substantially aligned with the extension on the second upper surface of the second substrate;
    the extension and the cavity being dimensioned and spaced to interfit, fluidically connecting the first fluidic opening to the second fluidic opening, thereby fluidically connecting the first fluidic pathway in the first substrate with the second fluidic pathway in the second substrate.

11. The microfluidic interconnect of claim 10 wherein the first substrate further comprises a silicon substrate.

12. The microfluidic interconnect of claim 11 wherein the second substrate further comprises a silicon substrate.

13. The microfluidic interconnect of claim 12 wherein the adhesive layer comprises one or more materials selected from the group consisting of liquid adhesive, sheet adhesive, double sided adhesive, conductive adhesive, non-conductive adhesive, thermoplastic polymer, thermoset polymer, transfer tape, epoxy, cyanate ester, cyanoacrylate, polyester, polyimide, fusible glass, solder and braze.

14. The microfluidic interconnect of claim 13 wherein the first substrate further comprises a microfluidic device, in fluid communication with the first fluidic pathway.

15. The microfluidic interconnect of claim 14 wherein the diameter of the first fluidic opening is between about 20 microns and 100 microns.

16. The microfluidic interconnect of claim 15 wherein the diameter of the cavity is between about 100 microns and 500 microns.

17. The microfluidic interconnect of claim 16 wherein the diameter of the extension is between about 100 microns and 500 microns.

18. The microfluidic interconnect of claim 17 wherein the diameter of the second fluidic opening is between about 20 microns and 100 microns.

19. A microfluidic interconnect comprising:
   a first substrate comprising:
      a first upper surface and an opposed first lower surface,
      a cavity disposed in the first lower surface, the cavity having a first bounding surface, and a first fluidic opening disposed on the first bounding surface;
      a first fluidic pathway disposed within the first substrate, fluidically connected to the first fluidic opening;
   a second substrate comprising:
      a second upper surface and an opposed second lower surface;
      an extension disposed on the second upper surface, the extension having a second bounding surface and a second fluidic opening disposed on the second bounding surface;
      a third fluidic opening disposed on the second lower surface;
      a second fluidic pathway disposed within the second substrate, fluidically connecting the second fluidic opening to the third fluidic opening;
      means for bonding the first lower surface of the first substrate to the second upper surface of the second substrate, the bonding means having a through hole, substantially aligned with the extension on the second upper surface of the second substrate;
   the extension and the cavity being dimensioned and spaced to interfit, fluidically connecting the first fluidic opening to the second fluidic opening, thereby fluidically connecting the first fluidic pathway in the first substrate with the second fluidic pathway in the second substrate;
   a third substrate comprising:
      a third upper surface and an opposed third lower surface;
      a fourth fluidic opening disposed on the third upper surface;
      a third fluidic channel within the third substrate, fluidically connected to the fourth fluidic opening;
   means for sealing the second lower surface of the second substrate, to the third upper surface of the third substrate, the sealing means having a through hole fluidically connecting the third fluidic opening to the fourth fluidic opening;
   means for clamping the sealing means between the second lower surface of the second substrate and the third upper surface of the third substrate;
   whereby the first fluidic pathway in the first substrate is fluidically connected to the second fluidic pathway in the second substrate and, the second fluidic pathway in the second substrate is fluidically connected to the third fluidic pathway in the third substrate.

20. The microfluidic interconnect of claim 19 wherein the first substrate further comprises a silicon substrate.

21. The microfluidic interconnect of claim 20 wherein the second substrate further comprises a silicon substrate.

22. The microfluidic interconnect of claim 21 wherein the bonding means comprises one or more selected from the group consisting of: an anodic bond, and a direct bond.

23. The microfluidic interconnect of claim 22 wherein the first substrate further comprises a microfluidic device, in fluid communication with the first fluidic pathway.

24. The microfluidic interconnect of claim 23 wherein the diameter of the first fluidic opening is between about 20 microns and 100 microns.

25. The microfluidic interconnect of claim 24 wherein the diameter of the cavity is between about 100 microns and 500 microns.

26. The microfluidic interconnect of claim 25 wherein the diameter of the extension is between about 100 microns and 500 microns.

27. The microfluidic interconnect of claim 26 wherein the diameter of the second fluidic opening is between about 20 microns and 100 microns.

28. The microfluidic interconnect of claim 23 wherein the third substrate further comprises a material selected from the group consisting of: polymer, plastic, glass-polymer composite, resin material, fiber-reinforced composite, printed wiring board composition, FR-4, epoxy-glass composite, epoxy, polyimide, fluoropolymer, polyether ether ketone, polydimethylsiloxane, ceramic, glass, glass-ceramic composite, glass-coated metal, alumina, beryllium oxide, silicon nitride, aluminum nitride, titanium nitride, titanium carbide, low temperature co-fired ceramic multilayered material and a high temperature co-fired ceramic multilayered material.

29. The microfluidic interconnect of claim 28 wherein fluidic connection of the third fluidic opening to the fourth fluidic opening further comprises a fanout.

30. The microfluidic interconnect of claim 28 wherein the third substrate further comprises an electronics package selected from the group consisting of: a dual-inline, TO, quad flatpack, pin grid array, ball grid array, small outline, chip carrier and plastic leaded chip carrier.

31. The microfluidic interconnect of claim 30 further comprising means for electrically interconnecting the microfluidic device to the electronics package.

32. The microfluidic interconnect of claim 28 further comprising means for optically accessing the microfluidic device.

33. A microfluidic interconnect comprising:
   a first substrate comprising:
      a first upper surface and an opposed first lower surface;
      a cavity disposed in the first lower surface, the cavity having a first bounding surface, and a first fluidic opening disposed on the first bounding surface;
      a first fluidic pathway disposed within the first substrate, fluidically connected to the first fluidic opening;
   a second substrate comprising:
      a second upper surface and an opposed second lower surface;

an extension disposed on the second upper surface, the extension having a second bounding surface and a second fluidic opening disposed on the second bounding surface;

a third fluidic opening disposed on the second lower surface;

a second fluidic pathway disposed within the second substrate, fluidically connecting the second fluidic opening to the third fluidic opening;

means for bonding the first lower surface of the first substrate to the second upper surface of the second substrate, the bonding means having a through hole, substantially aligned with the extension on the second upper surface of the second substrate;

the extension and the cavity being dimensioned and spaced to interfit, fluidically connecting the first fluidic opening to the second fluidic opening, thereby fluidically connecting the first fluidic pathway in the first substrate with the second fluidic pathway in the second substrate;

a third substrate comprising:
a third upper surface and an opposed third lower surface;
a fourth fluidic opening disposed on the third upper surface;
a third fluidic channel within the third substrate, fluidically connected to the fourth fluidic opening;

an adhesive layer in contact with the second lower surface of the second substrate and the third upper surface of the third substrate, the adhesive layer having a through hole, fluidically connecting the third fluidic opening to the fourth fluidic opening;

whereby the first fluidic pathway in the first substrate is fluidically connected to the second fluidic pathway in the second substrate and, the second fluidic pathway in the second substrate is fluidically connected to the third fluidic pathway in the third substrate.

34. The microfluidic interconnect of claim 33 wherein the first substrate further comprises a silicon substrate.

35. The microfluidic interconnect of claim 34 wherein the second substrate further comprises a silicon substrate.

36. The microfluidic interconnect of claim 35 wherein the bonding means comprises one or more selected from the group consisting of: an anodic bond, and a direct bond.

37. The microfluidic interconnect of claim 36 wherein the first substrate further comprises a microfluidic device, in fluid communication with the first fluidic pathway.

38. The microfluidic interconnect of claim 37 wherein the diameter of the first fluidic opening is between about 20 microns and 100 microns.

39. The microfluidic interconnect of claim 38 wherein the diameter of the cavity is between about 100 microns and 500 microns.

40. The microfluidic interconnect of claim 39 wherein the diameter of the extension is between about 100 microns and 500 microns.

41. The microfluidic interconnect of claim 40 wherein the diameter of the second fluidic opening is between about 20 microns and 100 microns.

42. The microfluidic interconnect of claim 37 wherein the third substrate further comprises a material selected from the group consisting of: polymer, plastic, glass-polymer composite, resin material, fiber-reinforced composite, printed wiring board composition, FR-4 epoxy-glass composite, epoxy, polyimide, fluoropolymer, polyether ether ketone, polydimethylsiloxane, ceramic, glass, glass-ceramic composite, glass-coated metal, alumina, beryllium oxide, silicon nitride, aluminum nitride, titanium nitride, titanium carbide, low temperature co-fired ceramic multilayered material and a high temperature co-fired ceramic multilayered material.

43. The microfluidic interconnect of claim 42 wherein the adhesive layer comprises one or more materials selected from the group consisting of: liquid adhesive, sheet adhesive, double sided adhesive, conductive adhesive, non-conductive adhesive, thermoplastic polymer, thermoset polymer, transfer tape, epoxy, cyanate ester, cyanoacrylate, polyester, polyimide, fusible glass, solder and braze.

44. The microfluidic interconnect of claim 43 wherein fluidic connection of the third fluidic opening to the fourth fluidic opening further comprises a fanout.

45. The microfluidic interconnect of claim 43 wherein the third substrate further comprises an electronics package selected from the group consisting of: a dual-inline, TO, quad flatpack, pin grid array, ball grid array, small outline, chip carrier and plastic leaded chip carrier.

46. The microfluidic interconnect of claim 45 further comprising means for electrically interconnecting the microfluidic device to the electronics package.

47. The microfluidic interconnect of claim 43 further comprising means for optically accessing the microfluidic device.

48. A microfluidic interconnect comprising:
a first substrate comprising:
a first upper surface and an opposed first lower surface;
a cavity disposed in the first lower surface, the cavity having a first bounding surface, and a first fluidic opening disposed on the first bounding surface;
a first fluidic pathway disposed within the first substrate, fluidically connected to the first fluidic opening;

a second substrate comprising:
a second upper surface and an opposed second lower surface;
an extension disposed on the second upper surface, the extension having a second bounding surface and a second fluidic opening disposed on the second bounding surface;
a third fluidic opening disposed on the second lower surface;
a second fluidic pathway disposed within the second substrate, fluidically connecting the second fluidic opening to the third fluidic opening;

an adhesive layer in contact with the first lower surface of the first substrate and the second upper surface of the second substrate, the adhesive layer having a through hole, substantially aligned with the extension on the second upper surface of the second substrate;

the extension and the cavity being dimensioned and spaced to interfit, fluidically connecting the first fluidic opening to the second fluidic opening, thereby fluidically connecting the first fluidic pathway in the first substrate with the second fluidic pathway in the second substrate;

a third substrate comprising:
a third upper surface and an opposed third lower surface;
a fourth fluidic opening disposed on the third upper surface;
a third fluidic channel within the third substrate, fluidically connected to the fourth fluidic opening;

means for sealing the second lower surface of the second substrate, to the third upper surface of the third substrate, the sealing means having a through hole fluidically connecting the third fluidic opening to the fourth fluidic opening;

means for damping the sealing means between the second lower surface of the second substrate and the third upper surface of the third substrate whereby the first fluidic pathway in the first substrate is fluidically connected to the second fluidic pathway in the second substrate and, the second fluidic pathway in the second substrate is fluidically connected to the third fluidic pathway in the third substrate.

49. The microfluidic interconnect of claim 48 wherein the first substrate further comprises a silicon substrate.

50. The microfluidic interconnect of claim 49 wherein the second substrate further comprises a silicon substrate.

51. The microfluidic interconnect of claim 50 wherein the adhesive layer comprises one or more materials selected from the group consisting of: liquid adhesive, sheet adhesive, double sided adhesive, conductive adhesive, non-conductive adhesive, thermoplastic polymer, thermoset polymer, transfer tape, epoxy, cyanate ester, cyanoacrylate, polyester, polyimide, fusible glass, solder and braze.

52. The microfluidic interconnect of claim 51 wherein the first substrate further comprises a microfluidic device, in fluid communication with the first fluidic pathway.

53. The microfluidic interconnect of claim 52 wherein the diameter of the first fluidic opening is between about 20 microns and 100 microns.

54. The microfluidic interconnect of claim 53 wherein the diameter of the cavity is between about 100 microns and 500 microns.

55. The microfluidic interconnect of claim 54 wherein the diameter of the extension is between about 100 microns and 500 microns.

56. The microfluidic interconnect of claim 55 wherein the diameter of the second fluidic opening is between about 20 microns and 100 microns.

57. The microfluidic interconnect of claim 52 wherein the third substrate further comprises a material selected from the group consisting of: polymer, plastic, glass-polymer composite, resin material, fiber-reinforced composite, printed wiring board composition, FR-4, epoxy-glass composite, epoxy, polyimide, fluoropolymer, polyether ether ketone, polydimethylsiloxane, ceramic, glass, glass-ceramic composite, glass-coated metal, alumina, beryllium oxide, silicon nitride, aluminum nitride, titanium nitride, titanium carbide, low temperature co-fired ceramic multilayered material and a high temperature co-fired ceramic multilayered material.

58. The microfluidic interconnect of claim 57 wherein fluidic connection of the third fluidic opening to the fourth fluidic opening further comprises a fanout.

59. The microfluidic interconnect of claim 57 wherein the third substrate further comprises an electronics package selected from the group consisting of a dual-inline, TO, quad flatpack, pin grid array ball grid array, small outline, chip carrier and plastic leaded chip carrier.

60. The microfluidic interconnect of claim 59 further comprising means for electrically interconnecting the microfluidic device to the electronics package.

61. The microfluidic interconnect of claim 57 further comprising means for optically accessing the microfluidic device.

62. A microfluidic interconnect comprising:
a first substrate comprising:
a first upper surface and an opposed first lower surface;
a cavity disposed in the first lower surface, the cavity having a first bounding surface, and a first fluidic opening disposed on the first bounding surface;
a first fluidic pathway disposed within the first substrate, fluidically connected to the first fluidic opening;
a second substrate comprising:
a second upper surface and an opposed second lower surface;
an extension disposed on the second upper surface, the extension having a second bounding surface and a second fluidic opening disposed on the second bounding surface;
a third fluidic opening disposed on the second lower surface;
a second fluidic pathway disposed within the second substrate, fluidically connecting the second fluidic opening to the third fluidic opening;
a first adhesive layer in contact with the first lower surface of the first substrate and the second upper surface of the second substrate, the first adhesive layer having a through hole, substantially aligned with the extension on the second upper surface of the second substrate;
the extension and the cavity being dimensioned and spaced to interfit, fluidically connecting the first fluidic opening to the second fluidic opening, thereby fluidically connecting the first fluidic pathway in the first substrate with the second fluidic pathway in the second substrate;
a third substrate comprising:
a third upper surface and an opposed third lower surface;
a fourth fluidic opening disposed on the third upper surface;
a third fluidic channel within the third substrate, fluidically connected to the fourth fluidic opening;
a second adhesive layer in contact with the second lower surface of the second substrate and the third upper surface of the third substrate, the second adhesive layer having a through hole, fluidically connecting the third fluidic opening to the fourth fluidic opening;
whereby the first fluidic pathway in the first substrate is fluidically connected to the second fluidic pathway in the second substrate and, the second fluidic pathway in the second substrate is fluidically connected to the third fluidic pathway in the third substrate.

63. The microfluidic interconnect of claim 62 wherein the first substrate further comprises a silicon substrate.

64. The microfluidic interconnect of claim 63 wherein the second substrate further comprises a silicon substrate.

65. The microfluidic interconnect of claim 64 wherein the first adhesive layer comprises one or more materials selected from the group consisting of: liquid adhesive, sheet adhesive, double sided adhesive, conductive adhesive, non-conductive adhesive, thermoplastic polymer, thermoset polymer, transfer tape, epoxy, cyanate ester, cyanoacrylate, polyester, polyimide, fusible glass, solder and braze.

66. The microfluidic interconnect of claim 65 wherein the first substrate further comprises a microfluidic device, in fluid communication with the first fluidic pathway.

67. The microfluidic interconnect of claim 66 wherein the diameter of the first fluidic opening is between about 20 microns and 100 microns.

68. The microfluidic interconnect of claim 67 wherein the diameter of the cavity is between about 100 microns and 500 microns.

69. The microfluidic interconnect of claim 68 wherein the diameter of the extension is between about 100 microns and 500 microns.

70. The microfluidic interconnect of claim 69 wherein the diameter of the second fluidic opening is between about 20 microns and 100 microns.

71. The microfluidic interconnect of claim 66 wherein the third substrate further comprises a material selected from the group consisting of: polymer, plastic, glass-polymer composite, resin material, fiber-reinforced composite, printed wiring board composition, FR-4, epoxy-glass composite, epoxy, polyimide, fluoropolymer, polyether ether ketone, polydimethylsiloxane, ceramic, glass, glass-ceramic composite, glass-coated metal, alumina, beryllium oxide, silicon nitride, aluminum nitride, titanium nitride, titanium carbide, low temperature co-fired ceramic multilayered material and a high temperature co-fired ceramic multilayered material.

72. The microfluidic interconnect of claim 71 wherein the second adhesive layer comprises one or more materials selected from the group consisting of: liquid adhesive, sheet adhesive, double sided adhesive, conductive adhesive, non-conductive adhesive, thermoplastic polymer, thermoset polymer, transfer tape, epoxy, cyanate ester, cyanoacrylate, polyester, polyimide, fusible glass, solder and braze.

73. The microfluidic interconnect of claim 72 wherein fluidic connection of the third fluidic opening to the fourth fluidic opening further comprises a fanout.

74. The microfluidic interconnect of claim 71 wherein the third substrate further comprises an electronics package selected from the group consisting of: a dual-inline, TO, quad flatpack, pin grid array, ball grid array, small outline, chip carrier and plastic leaded chip carrier.

75. The microfluidic interconnect of claim 74 further comprising means for electrically interconnecting the microfluidic device to the electronics package.

76. The microfluidic interconnect of claim 72 further comprising means for optically accessing the microfluidic device.

* * * * *